(No Model.) 3 Sheets—Sheet 1.

C. MEE.

BICYCLE STAND.

No. 535,594. Patented Mar. 12, 1895.

Witnesses.
F. G. Houck
F. R. Smith

Chas. Mee,
Inventor.

THE NORRIS PETERS CO., PHOTO-LITHO., WASHINGTON, D. C.

(No Model.)

3 Sheets—Sheet 2.

C. MEE.

BICYCLE STAND.

No. 535,594.

Patented Mar. 12, 1895.

Witnesses

F G Houck
F R Smith

Chas. Mee,

Inventor.

THE NORRIS PETERS CO., PHOTO-LITHO., WASHINGTON, D. C.

(No Model.)

3 Sheets—Sheet 3.

C. MEE.

BICYCLE STAND.

No. 535,594.

Patented Mar. 12, 1895.

Witnesses.
F. G. Houck
L. R. Smith

Chas. Mee.
Inventor.

THE NORRIS PETERS CO., PHOTO-LITHO., WASHINGTON, D. C.

UNITED STATES PATENT OFFICE.

CHARLES MEE, OF CORTLAND, NEW YORK.

BICYCLE-STAND.

SPECIFICATION forming part of Letters Patent No. 535,594, dated March 12, 1895.

Application filed April 30, 1894. Serial No. 509,531. (No model.)

*To all whom it may concern:*

Be it known that I, CHARLES MEE, a citizen of the United States, residing at Cortland, in the county of Cortland and State of New York, have invented a new and useful Bicycle-Stand, of which the following is a specification.

My invention relates to improvements in bicycle stands, and the objects of my improvements are, first, to provide a stand to be attached to and which can be applied to all kinds of bicycles and which will hold a bicycle in an upright position when not in motion; second, to provide a stand that will hold a bicycle firmly and erect when the bicycle is not in use; third, to provide a stand for holding in an upright position a bicycle when not in use, and at the same time to secure the same in an erect position and locked so as to prevent the same from falling down or being taken away by moving the same upon its wheels. I accomplish these results and objects by the mechanism shown and illustrated in the accompanying drawings, in which—

Figure 1:
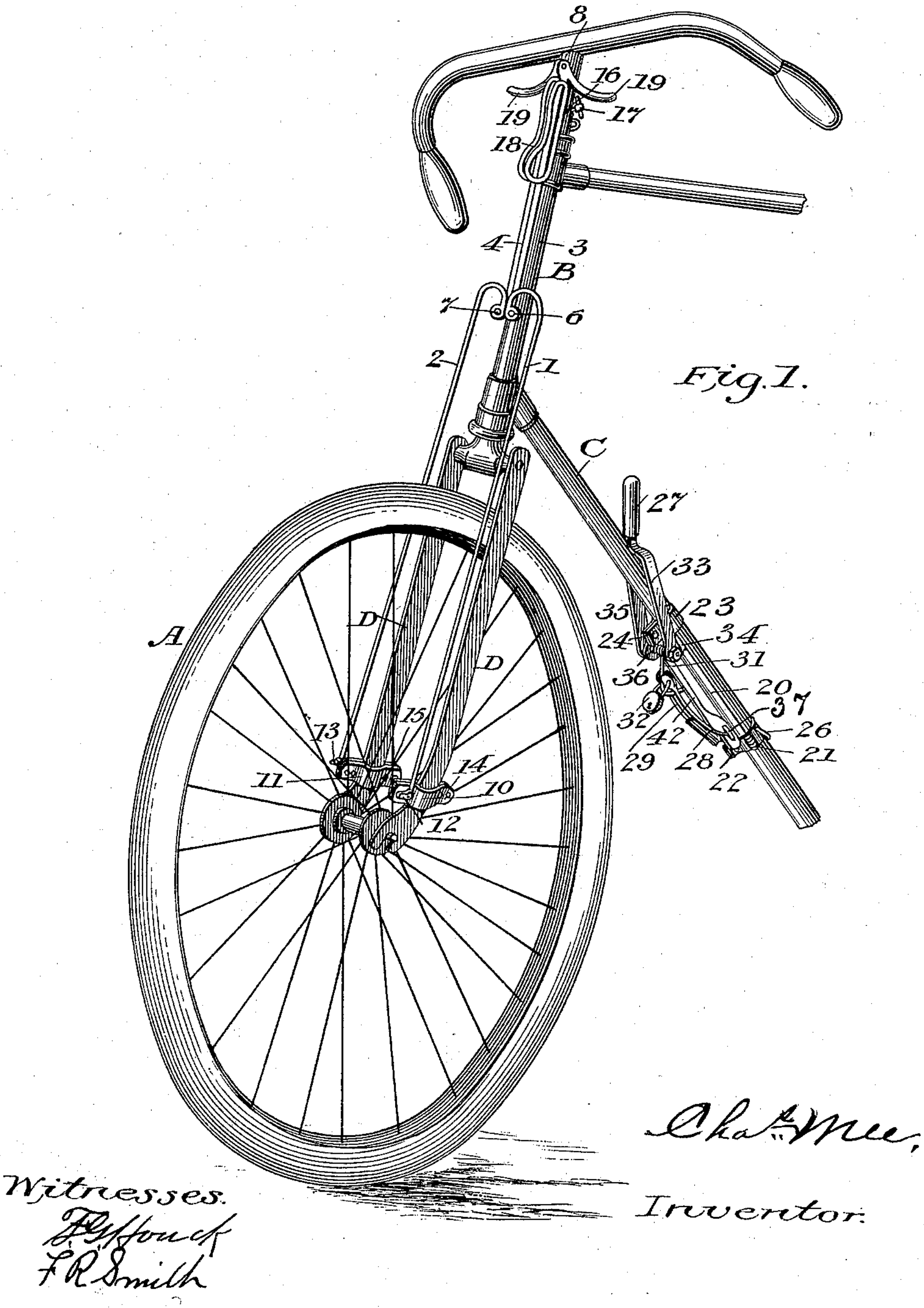
Figure 2:
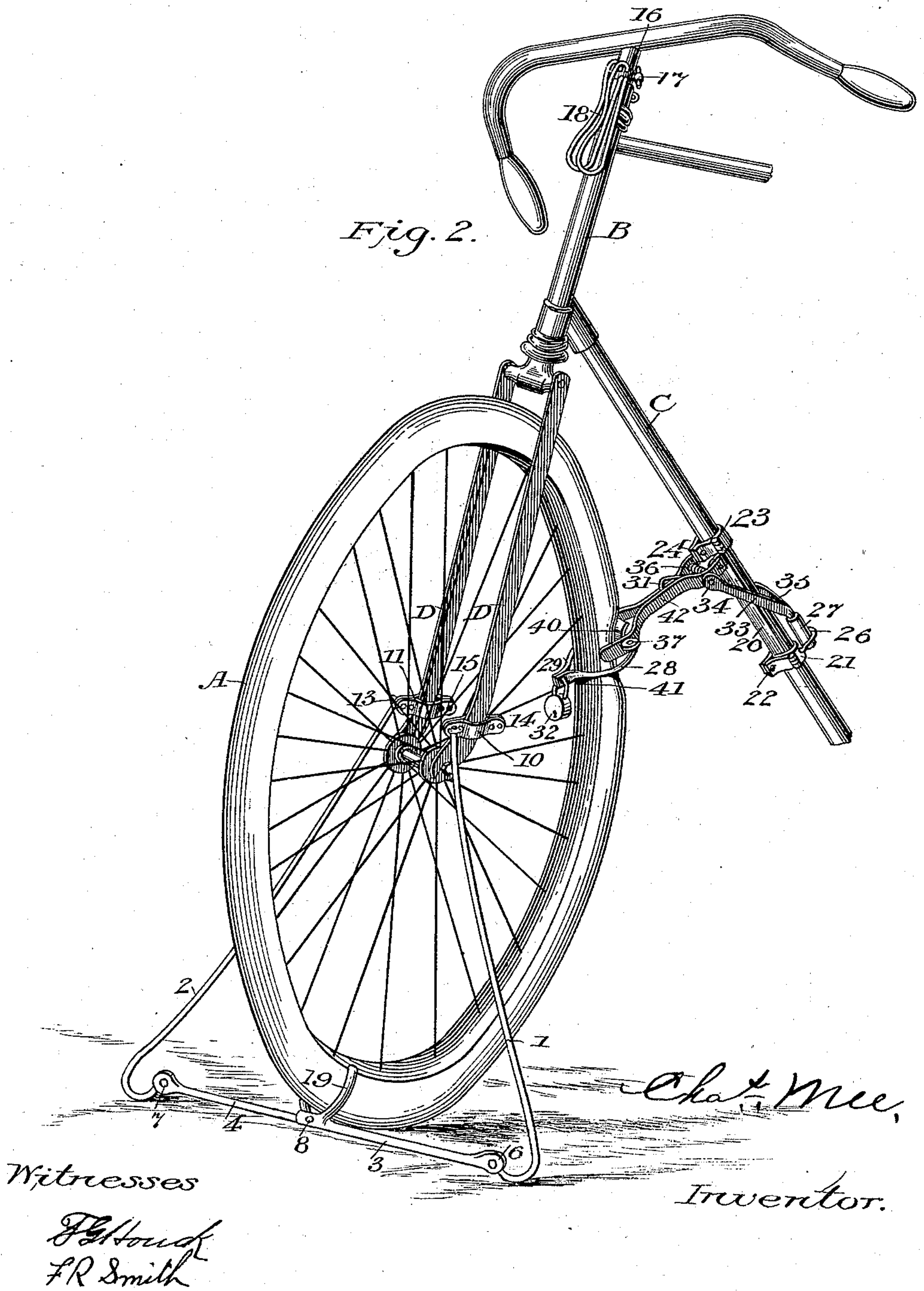
Figure 6:
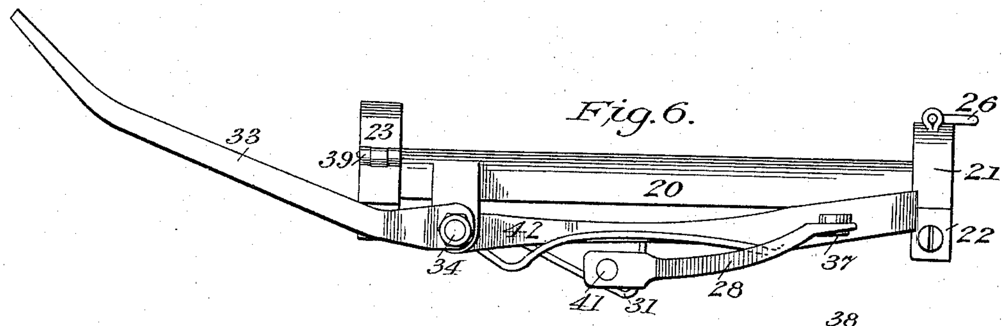
Figure 5:
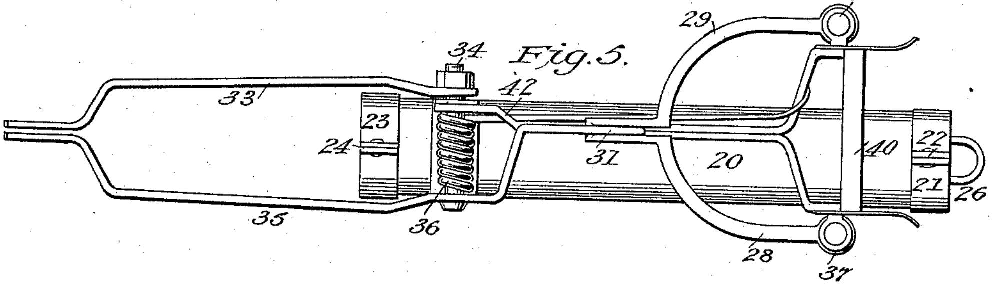
Figure 3:
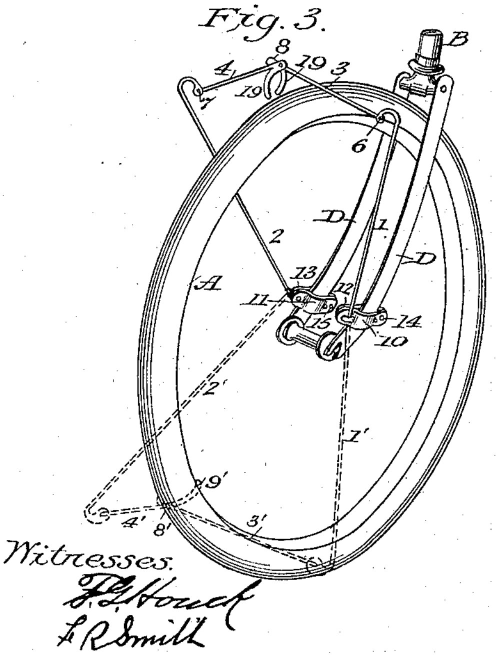
Figure 4:
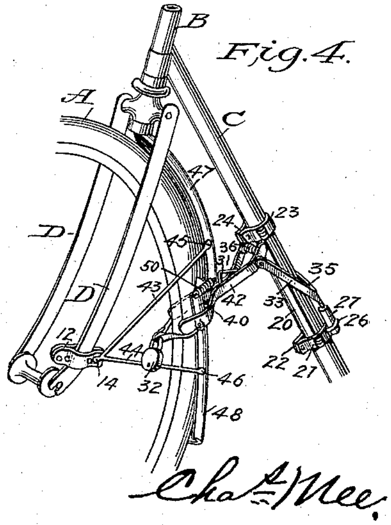

Figure 1, is a view of my invention attached to a bicycle as it appears when not in use. Fig. 2 is a view of my invention attached to a bicycle applied and in use. Fig. 3, is a detail view of the stand part of my invention attached to a bicycle and in the process of being applied. Fig. 4, is a detail view of a portion of my invention showing the application thereof in connection or in combination with a mudguard attached to said bicycle. Fig. 5, is a detail view showing in detail that portion of my invention used to keep the bicycle in position when the stand is applied and in use, showing the construction thereof as shown by a view from the under side thereof. Fig. 6, is a side view of the same portion of my invention as shown in Fig. 5.

Similar letters and figures refer to similar parts throughout the several views.

A, is the wheel of a bicycle.

B, is the upper portion of the standard to which the handles are attached.

C, is the supporting bar passing from the standard or head B, to the supports of the back wheel of a bicycle.

D, D, are the front fork of the bicycle connected with the axis of the front wheel of a bicycle.

My invention is intended to be applied to the front wheel.

1, 2, are the lower arms of the stand. 3, 4, are the upper arms thereof.

6, is a bolt passing through the ends of arms 1 and 3, connecting the same. 7, is a similar bolt passing through the ends of 2 and 4 and connecting the same.

19, and 19, are prongs, arc shaped, at the ends of arms 3 and 4, respectively.

10, is a clamp fastened to one of the prongs of the fork D, D, by bolts passing through each end thereof, secured by proper screws. 11, is a similar clamp on the other prong of the fork D, D, secured by bolts, as in the case of 10. The arms 1 and 2, are secured to the outer ends of the clamps 10 and 11, respectively, at 12 and 13, respectively, by means of bolts passing through the ends thereof, and through the ends of the clamps 10 and 11, secured by nuts.

The application of the arms 1 and 2, to the clamps 10 and 11, as aforesaid, and the joining of the arms 1 and 3, and 2 and 4, at 6 and 7, respectively, and the joining of the arms 3 and 4, at 8, as aforesaid, is all done in such manner as to make a movable joint at each of the places, 12, 13, 6, 7, and 8.

18, are two parallel oblong or other shaped springs placed near enough together and extending the necessary distance above and below to form a spring clamp or receiver for the stand part of my invention when not in use.

16, is a collar placed around the standard of the handles attached to and holding 18, and 17 is a thumb-screw to hold the same firmly in place.

20 is an arc shaped plate placed at a proper place on the under side of bar C, and fastened thereto by the band 21, at the lower end, and the band 23 at the upper end thereof, said bands being secured by bolts or screws at 22, and 24, respectively.

26, is an adjustable ring or loop fastened on the top of band 21, so arranged that when not in use, it will lie down flat on the bar C, or when it is desired to use the same, it can be lifted up to make a loop.

35, is an arm bent in proper shape having one end small and free, and the other end fastened to the fork shaped brake 40.

42, is an arm having one end fastened to the fork shaped brake 40 and the other end secured by a bolt and nut at 34.

36, is a spiral spring or other suitable spring fastened to said arm 42, coiled around the bolt 34. The arm 34 passes through the arm 35, the spiral spring 36, the arm 42, and the arm 33, holding the same together and securing the same with a nut.

40, is a fork shaped shoe or bar fastened to the extremity of the arm 35, to the arm 42, and affixed thereto firmly and securely.

28, is an arc shaped bar secured to the arm 42, by means of a swivel joint at 37. 29 is an arc shaped bar secured to the arm 42, by a swivel joint at 38. These two arc shaped bars 28, and 29, are complements of each other, and the free ends thereof are extended parallel to each other, and have each a hole through the same at 41. These two arc shaped bars 28, and 29, when placed in position form on the inside thereof a complete arc.

31, is a loop or flat disk with a hole through the same extending from the arm 42; the loop or the hole through said disk being placed in such a position that a rod or bolt may pass through the same and at the same time through the hole 41, at the free ends of the arc shaped bars 28, and 29.

32, is an ordinary lock, the staple of which may be placed through the hole 41, in the end of bars 28 and 29, and also through the loop or hole 31.

27 is a wooden or metal handle or ferrule with a hole in one end thereof so constructed and large enough to receive the free ends of arms 33, and 35 to constitute a handle or ferrule therefor, and to secure the same when desired.

43, is a bar extending from the inner end of clamp 10, to the upper portion of the mud-guard 47, and connected therewith firmly at 45. 44, is a similar bar or rod extending from the inner end of the clamp 10, to the lower portion of the mud-guard 48, and connected firmly therewith at 46, the connections at 45, and 46, being by rivets or other substantial means.

The bars 43, and 44, are joined together on the inner ends at the ends thereof and the hole made through the same through which a bolt passes, and also passes through the hole through the inner end of the clamp 10, and secured to said clamp at the place last aforesaid, by said bolt at 14. It is not necessary that the ends of bars 43 and 44, be united at the inner ends. They may be two separate bars, though preferably they should be united.

The mud-guard when used in connection with my invention, or when a mud-guard is used upon a bicycle to which my invention is applied, it is desirable that it be connected and stayed as herein indicated, but that it be broken or separated between the junction of bar 43, with the mud-guard at 45, and the junction of the bar 44, with said mud-guard at 46, but connected with a spiral spring 50, to draw the inner ends together when my invention is not applied.

Having thus described the several parts of my invention I will proceed to describe the operation thereof.

When the bicycle is in use the arms 1, 2, 3, 4, are brought up to the front side, and quite, or nearly parallel with the standard or head B, and fork D, D, and the upper portion thereof is pressed between the oblong springs 18, until the prongs 9, and 19, pass over the top thereof and fall in the open space above, where and by means whereof, they are held secure and out of the way of the person operating the bicycle. At the same time the loop 26, is removed from the handle or ferrule 27, which latter being let go, the brake is drawn backward and against the under side of the bar C, by means of the spring 36, all of which is shown in Fig. 1 of the drawings accompanying this specification. The wheel is then ready for use without any obstruction from either portion or part of my invention.

When a person desires to secure his bicycle in an upright and erect position for the purpose of leaving it, or for any other purpose, he may be aided in so doing by the application of my invention, as follows: He will turn the thumb-screw 17, to loosen the collar 16, slide the collar down until the prongs 9, and 19, will slip over the upper ends of the parallel oblong rings 18, when by a little pressure forward they are free, and then being brought still farther forward and extending the arms laterally until in or nearly in the first position shown in Fig. 3, they are moved forward and down, the inside of the prongs 9, and 19, being pressed against the outer rim of the wheel. As shown in the second position in Fig. 3, it will be seen that the prongs 9, and 19, take a gentle clasp upon the wheel at its lower quarter. Then by running the wheel slightly forward the pressure of the prongs 9, and 19, becomes firm at the point where the ends of arms 1, and 2, are firmly fixed upon the ground, and the arms 3, and 4, are extended to a line where one of said arms is an extension of the other. If the wheel is held in that position the arms 1, and 2, being secured to the wheel by the bolts at 12, and 13, of the clamps 10, and 11, and the prongs 9, and 19, being also attached to the wheel as shown in Fig. 2, said arms 1, and 2, held together by the arms 3, and 4, and the bolts 6, 7, and 8, form a base or triangular stand to hold the wheel erect, but the wheel must be kept in that position or the stand will get out of place. Hence, for the purpose of securing the desired position of the wheel after it has obtained such position, I bring to my aid that part of my invention secured to the bar C, as follows: Take hold of the handle or ferrule 27, and press it backward and downward until it lies parallel to and against the upper side of the bar C. Then take the loop or ring 26, press it upward and forward until it is over the handle or ferrule 27, when it will be seen that the fork shaped brake 40, secured to the arms 35, and 42, is pressed against the back side of the wheel applying thereto and forming against the same a brake firmly held thereto by ring 26, over the handle or ferrule 27, and then if it is desired to leave the wheel and to secure it against being disturbed or taken away upon its wheels, bring forward the arc shaped bands or bars 28, by aid of the swivel joints 37, and 38, until the free ends thereof meet on the inside of the wheel when by passing the staple of the lock 32, through the holes 41 in the free ends of said bars 28, and 29, and locking said lock, it will be found that the front wheel of the bicycle is not only secured and stayed in a position required to continue the application of my stand to keep the wheel in an upright position, but also the wheel is so secured that it cannot be removed by running the same away upon the wheels thereof, and meddlers are prevented from using the wheel.

The above description of the application of my invention to a wheel supposes that no mud-guard is attached to said wheel, but if it be desired to have a mud-guard to said wheel said guard may be applied in sections and secured as heretofore described and as shown in Fig. 4 of the accompanying drawings. Then the application of the stand part of my invention will be precisely as heretofore described, and the brake will be applied as before by operating the handle or ferrule 27, backward and down parallel to and against the upper side of the bar C, and secure the same by the loop 26, as before, when it will be seen that the fork shaped brake 40, secured as hereinbefore described, will be brought to press against the upper end of the lower section of the guard 48, pressing the same against the outer rim of the wheel, and then by passing the bands 28, and 29, around the wheel, as above described, and securing them by the lock as above described, the same results are obtained as before, the upper portion of the guard 47, being all the time held firmly in its original position by the bar 43, while the bar 44 being braced by and attached to the lower section of the mud-guard, operates as a fulcrum to said lower section. Upon removing the brake from said lower section as above described, the two sections of said mud-guard are instantly drawn together by the spiral spring 50, thereby removing the same over the outside of said wheel, leaving it free to act.

The arms and other parts of my invention may be made of iron, steel, brass, or other metal or suitable material. Preferably I would place on the inside of clamps 10, and 11, a rubber, felt or other lining, to prevent their marring the prongs of the fork D, D, and such lining may also be placed on the inner portions of the prongs 9, and 19, to prevent marring the wheel when brought in contact therewith, but the lining in neither of the cases above stated is essential to the effective working of my invention.

Having thus described my invention, its objects, and its operations, what I claim as my invention, and desire to secure by Letters Patent, is as follows:

1. The arc shaped plate 20, with the bands 21, 23, the bolts or screws 22, 24, the adjustable ring or loop 26, the arms 35, 33, and 42, the spiral spring 36, the bolt and nut 34, the fork shaped shoe 40, the arc shaped bars 28 and 29, the swivel joints 37, and 38, the loop 31, the hole 41, the free ends of the bars 28, and 29, the lock 32, the handle or ferrule 27, attached to and in combination with a bicycle as above described and for the purpose herein specified.

2. The arc shaped plate 20, with bands 21, 23, and bolts or screws 22, and 24, the adjustable ring or loop 26, the arms 35, 33, and 42, the spiral spring 36, the bolt and nut 34, the fork shaped shoe 40, the arc shaped bars 28, and 29, the swivel joints 37, and 38, the loop 31, the hole 41, through the free ends of the bars 28, and 29, the lock 32, the handle or ferrule 27, the clamps 10, and 11, the bars 43, and 44, connected with the sections of mud-guard 47, and 48, the sections of the mud-guard 47, and 48, the spiral spring 50, attached to and in combination with a bicycle as hereinabove described and for the purpose specified.

3. In combination the arms 1, 2, 3, and 4, joined together by the joints 6, 7, and 8, with the prongs 9, and 19, the spring clamps 18, attached to and held by the collar 16, having the thumb-screw 17, the swivel joints 12, and 13, attached to the fork D, D, of a bicycle, substantially as and for the purpose herein described and set forth.

4. In combination with a bicycle the lower arms 1, and 2, upper arms 3, and 4, pivoted to the lower arms at 6, and 7, the said upper arms pivoted at 8, with the prongs 9, and 19, extending therefrom constituting an adjustable clamp, the spring clamps 18, attached to and held by the collar 16, and the thumb-screw 17, the clamps 10, and 11, fastened to the bicycle and adjusted to engage by means of the swivel joints 12, and 13, the lower arms, aforesaid, the arc shaped plate 20, with the bands 21, and 23, having the adjustable loop 26, and attached to the supporting bar C, and the arms 35, 33, and 42, having the ferrule 27, the loop 31, the spiral spring 36, the bolt and nut 34, the shoe 40, with side extensions, the arc shaped bars 28, and 29, with the hole 41 in the free end thereof and connected with said bars by the swivel joints 37 and 38, the lock 32, substantially as and for the purpose herein set forth.

5. In combination with a bicycle the lower arms 1, and 2, upper arms 3, and 4, pivoted to the lower arms at 6, and 7, the upper arms pivoted at 8, and having extensions 9, and 19, forming an adjustable clamp, the spring clamp 18, attached to and held by the collar 16, with the thumb-screw 17, the swivel joints 12, and 13, the arc shaped plate 20, with the bands 21, 23, secured by bolts 22, 24, the adjustable loop 26, the arms 33, 35, 42, with the ferrule 27, the spiral spring 36, all secured by the bolt and nut 34, the fork shaped shoe 40, the arc shaped bars 28, and 29, turning on the swivel joints 37 and 38, connected with the lock 32, the bars 43, and 44, fastened to the clamps 10, and 11, and the sections 47, and 48, of the mud guard adjusted by the spiral spring 50, substantially as and for the purpose described and set forth.

CHAS. MEE.

Witnesses:
B. T. WRIGHT,
C. J. BROWN.